July 25, 1933.  E. A. MURPHY  1,919,248
FLUID SEAL FOR ROTATABLE MEMBERS
Filed Dec. 10, 1930
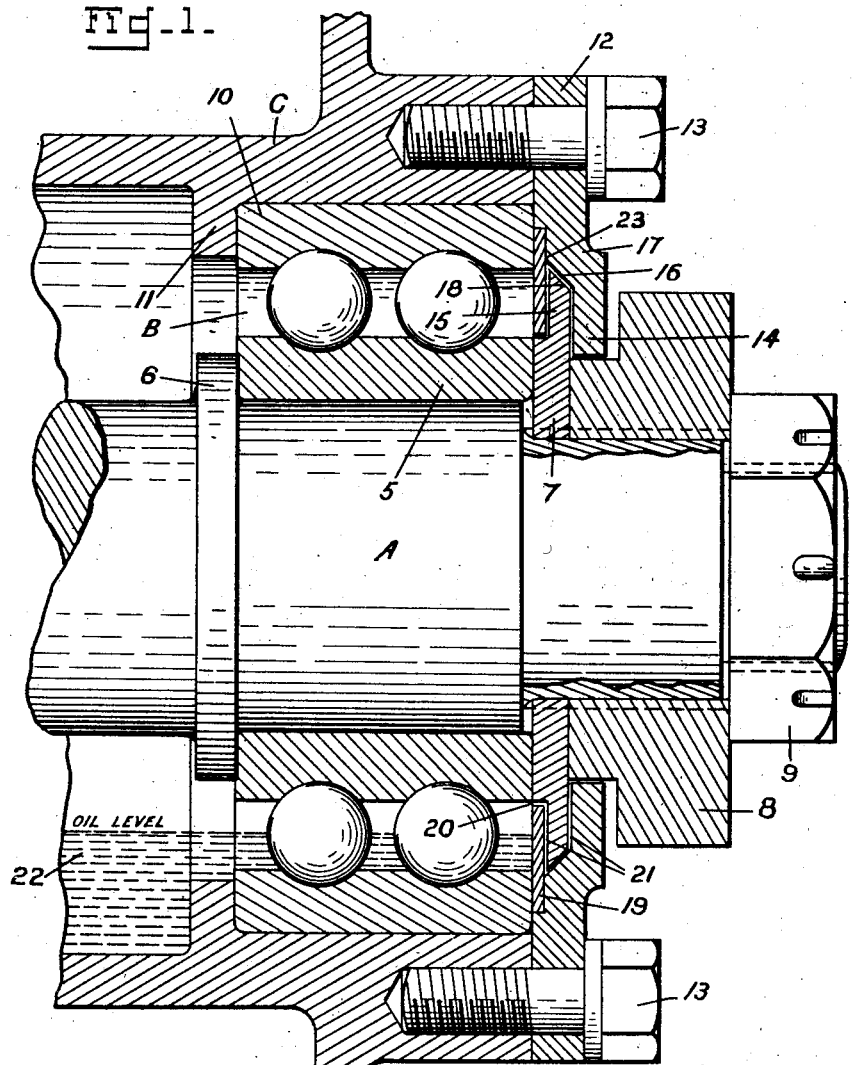
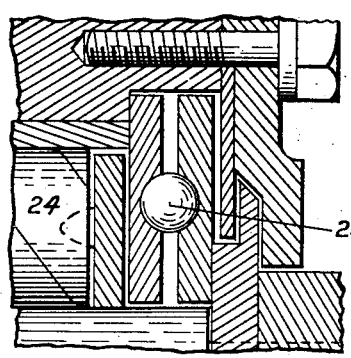
INVENTOR.
Edward A. Murphy
BY
W. N. Roach
ATTORNEY Patented July 25, 1933

1,919,248

UNITED STATES PATENT OFFICE

EDWARD A. MURPHY, UNITED STATES ARMY, OF RARITAN ARSENAL, METUCHEN, NEW JERSEY

FLUID SEAL FOR ROTATABLE MEMBERS

Application filed December 10, 1930. Serial No. 501,327.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

This invention relates to a fluid seal for rotatable members and, more particularly, it has reference to a fluid seal of the labyrinth type.

The purpose of the invention is to establish a fluid seal by means of a simple and compact arrangement of relatively rotatable members that are spaced from each other to prevent wear. The invention is characterized by the utilization of the principle that a liquid in contact with a revolving surface will travel to the periphery of the surface and be tangentially projected therefrom.

To these and other ends, the invention consists in the construction, arrangement and combination of elements, described hereinafter and pointed out in the claims forming a part of this specification.

A practical embodiment of the invention is illustrated in the accompanying drawing in which:

Fig. 1 is a longitudinal sectional view through a bearing;

Fig. 2 is a similar view showing the application of the invention to a bearing of a different type.

Referring to the drawing by characters of reference:

There is shown a shaft A, an antifriction bearing unit B on one end of the shaft, and a member C mounted on the bearing unit. The shaft A and the member C are relatively rotatable, the selection of the stationary and rotatable member depending on the particular application of the device. For the purpose of description the shaft A will be considered as the rotatable member.

The inner race 5 of the bearing unit is confined between a flange 6 on the shaft and a thrust washer 7 splined or pressed on the shaft and retained by the spacing collar 8 and nut 9.

The outer race 10 of the bearing unit is confined between a flange 11 on the member C and a cover plate 12 secured to the member C by means of the screw bolts 13. The inner marginal portion 14 of the cover plate is offset for disposition exteriorly of the marginal portion 15 of the washer 7 and it is spaced therefrom so that in action the metal parts will not be in contact. The inner face 16 of the offset 17 is spaced from and parallel to the rim 18 of the washer 7. The adjacent face 16 and rim 18 are inclined to the axis of the shaft A and away from the bearing unit, preferably at an angle of forty-five degrees.

A thin flat disc 19 fitted in a recess in the cover plate and flush with the inner face thereof is disposed interiorly of the reduced marginal portion 15 of the washer and in parallel, spaced relation with respect thereto. The disc 19 constitutes in effect a closure for the space between the inner and outer races of the bearing unit but it terminates short of the inner race 5 to provide an entry 20 to the annular space or passage 21 between the disc and the washer and the washer and the cover plate. As shown in the drawing, the entry 20 is above the level of the lubricating fluid 22 so that normally when the device is not in operation, there will be no leakage.

In operation, considering the shaft A as the rotatable member, the lubricating fluid picked up and transmitted to the inner race will form a film on the periphery of the race and under the influence of centrifugal force the fluid will tend to be projected tangentially. Under such a condition the point of entry 20 will be a point of minimum pressure. Fluid passing through the entry and finding its way into the passage 21 will be thrown outward to the periphery of the rotating washer 7 and be under a maximum pressure at the point 23 of abrupt reversal in the passage 21 caused by the inclinations of the rim 18 of the washer and the face 16 of the offset.

Any portion of the fluid tending to flow on the inclined rim will be subjected to the influence of centrifugal force and be projected to the point 23. Due to rotation of the washer and the movement of the tangentially projected fluid a back pressure and cross and eddy currents are set up and a film of fluid is established and a seal is effectively maintained between the inclined surfaces 16 and 18. This film not only prevents the escape of fluid but also the incursion of dust, water and foreign matter.

The action in producing a seal is similar when the member C is considered as the rotatable member.

In Fig. 2 the invention is illustrated in connection with a roller bearing 24 and a thrust bearing 25.

I claim:

A bearing member, an antifriction bearing unit carried by the bearing member, a rotatable member supported by the bearing unit, a washer fixed to the rotatable member and confining one portion of the bearing unit, a cover plate fixed to the bearing member and confining another portion of the bearing unit, said cover plate being offset for disposition exteriorly of the washer and spaced therefrom, the rim of the washer and the opposite surface of the cover plate being spaced and inclined, and a disc carried by the cover plate for disposition interiorly of the washer, said disc spaced laterally and peripherally from the washer.

EDWARD A. MURPHY.